United States Patent
Castillo et al.

(10) Patent No.: US 7,529,624 B2
(45) Date of Patent: May 5, 2009

(54) METHOD AND APPARATUS FOR REMOTE CHARACTERIZATION OF FAULTS IN THE VICINITY OF BOREHOLES

(75) Inventors: David A. Castillo, Trigg (AU); Pavel Peska, Prague (CZ); Daniel Moos, Palo Alto, CA (US)

(73) Assignee: Geomechanics International, Inc., Houston, TX (US)

( * ) Notice: Subject to any disclaimer, the term of this patent is extended or adjusted under 35 U.S.C. 154(b) by 0 days.

(21) Appl. No.: 11/709,514

(22) Filed: Feb. 21, 2007

(65) Prior Publication Data

US 2008/0201079 A1 Aug. 21, 2008

(51) Int. Cl.
*G06F 19/00* (2006.01)

(52) U.S. Cl. .................. 702/6; 702/7; 702/9; 702/11; 703/2; 703/6; 703/7; 703/9; 703/10

(58) Field of Classification Search .............. 702/6, 702/7, 9, 11; 703/2, 6, 7, 9, 10
See application file for complete search history.

(56) References Cited

U.S. PATENT DOCUMENTS

| | | | | |
|---|---|---|---|---|
| 5,576,485 A * | 11/1996 | Serata | ..................... | 73/152.17 |
| 6,098,021 A * | 8/2000 | Tang et al. | ..................... | 702/14 |
| 6,614,716 B2 * | 9/2003 | Plona et al. | ..................... | 367/31 |
| 6,766,254 B1 * | 7/2004 | Bradford et al. | ............... | 702/9 |
| 6,834,233 B2 * | 12/2004 | Economides et al. | ........... | 702/1 |
| 7,188,058 B2 * | 3/2007 | Hardy et al. | ................... | 703/10 |
| 2002/0059048 A1 * | 5/2002 | Hardy et al. | ................... | 703/10 |
| 2003/0158669 A1 * | 8/2003 | Davidson | ..................... | 702/18 |
| 2006/0106541 A1 * | 5/2006 | Hassan et al. | .................. | 702/6 |
| 2008/0126050 A1 * | 5/2008 | Logan | ......................... | 703/10 |

* cited by examiner

*Primary Examiner*—Carol S Tsai
(74) *Attorney, Agent, or Firm*—Hugh R. Kress (57) ABSTRACT

A method and system for characterization of fault conditions within a subterranean volume. In one embodiment, the system comprises means for mathematically modeling stress conditions, to predict breakout conditions along a borehole trajectory. The system further comprises means for sensing actual breakout conditions along the borehole. Predictive breakout data is compared with sensed breakout conditions to assess correlation between predictive data and actual data, verifying the accuracy of the stress model. The mathematical model may be revised to reflect the presence of an active fault plane in the volume, the presumed fault plane not being intersected by the borehole. The revised model is used to generate new predictive data. Revising the stress model and assessing correlation between predictive and actual breakout conditions is repeatable to achieve an optimally accurate stress model reflecting fault conditions proximal to but not necessarily penetrated by the borehole.

9 Claims, 6 Drawing Sheets

METHOD AND APPARATUS FOR REMOTE CHARACTERIZATION OF FAULTS IN THE VICINITY OF BOREHOLES

FIELD OF THE INVENTION

The present invention relates generally to hydrocarbon exploration and production, and more particularly relates to a method and apparatus for characterization of features in the vicinity of boreholes.

BACKGROUND OF THE INVENTION

Those of ordinary skill in the art will appreciate the challenges involved in imaging and identifying subterranean tectonic features that are proximal to, but not necessary penetrated by, a borehole. Characterization of subsurface features typically relies either upon a remote sensing imaging application (for example, approaches employing seismic exploration techniques and/or measurement of electrical potential fields), or upon direct sampling, i.e., drilling one or more boreholes.

In general, direct sampling techniques such as the drilling of boreholes are undesirably inefficient and costly. On the other hand, remote sensing technologies and modeling techniques have been employed in the prior art with limited success, and there thus remains an ongoing need for improved techniques for remote characterization of tectonic features or conditions, such as active faults in the proximity of but not necessarily penetrated by a borehole. Energy, resource, and environmental entities who require knowledge of active faults in the subsurface for characterizing fluid flow parameters through natural fractures and/or faults require information that describes the location and orientation of these active faults. Among other considerations, characterization of such features is important if undesirable drilling events, such as wellbore breakouts, are to be avoided.

SUMMARY OF THE INVENTION

In view of the foregoing and other considerations, the present invention is directed to a technique (a method and an associated apparatus for performing this method) for characterizing tectonic features in the vicinity of but not necessarily penetrated by a borehole within a subterranean volume.

In accordance with one aspect of the invention, a method is employed which relies upon the realization that faults that have been recently active will produce a secondary or localized stress perturbation that is superimposed upon the far-field tectonic stress field. This superimposed stress field will impact the development of drilling-induced wellbore breakouts. Specifically, wellbore breakouts will either rotate into a unique orientation, or their development at the borehole wall will be diminished.

In one embodiment of the invention, wireline and/or real-time imaging or other data from which the characteristics of breakouts along the wellbore can be determined as a function of positional along a well bore are used to constrain fault location(s) away from the borehole by modeling the effects of fault-induced stress changes on the characteristics of such breakouts.

In accordance with another aspect of the invention, the method does not require the borehole to penetrate the fault, nor does the method require there to be any evidence of a fault. Instead, the presence of the fault and its shape, orientation, and location are inferentially determined by observing changes in the orientation and width of breakouts along the borehole.

BRIEF DESCRIPTION OF THE DRAWINGS

The foregoing and other features and aspects of the present invention will be best appreciated by reference to a detailed description of the specific embodiments of the invention, when read in conjunction with the accompanying drawings, wherein.

DETAILED DESCRIPTION OF A SPECIFIC EMBODIMENT OF THE INVENTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering practices for the environment in question. It will be appreciated that such a development effort might be complex and time-consuming, but would nevertheless be a routine undertaking for those of ordinary skill in the relevant fields.

Figure 1:
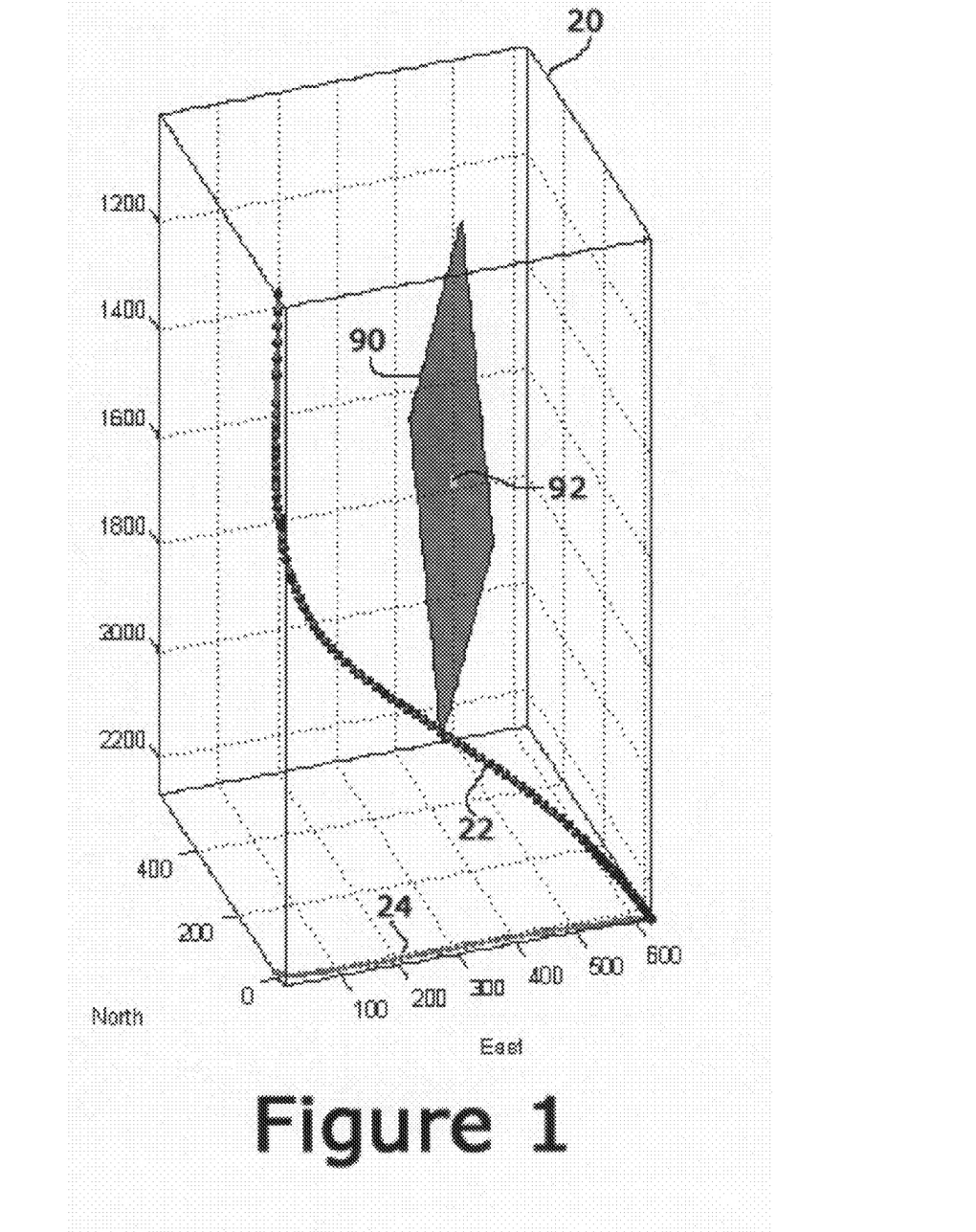
FIG. 1 is a perspective depiction of a subsurface volume having a borehole trajectory shown therein.

Referring to FIG. 1, there is shown a computer-generated model of a drilling operation within a volume 20. Shown in FIG. 1 is the trajectory of a borehole 22 extending through the volume 20 from a true vertical depth of 1000 m to a true vertical depth of 2400 m. As can be observed in FIG. 1, borehole 22 does not extend horizontally straight down into the volume, but rather deflects in a generally southerly direction as is common in conventional directional drilling operations. Not that the projection (shadow) 24 of borehole 22 on the "bottom" of the modeled volume 20 assists the viewer in understanding the true three-dimensional trajectory of borehole 22

The depiction of FIG. 1 is typical of the types of graphical presentations of well data provided to drilling operators using current state-of-the-art sensors, computer tools for analyzing available data and computer hardware for generating graphical images such as that shown in FIG. 1 to assist drilling operators in their actions. It is believed that those of ordinary skill in the art will be quite familiar with the various tools, computer hardware and applications, and the like that are available, and the selection and use of a particular combination of such technologies and other resources is not believed to be of particular relevance to the practice of the present invention.

Those of ordinary skill in the art will appreciate that in any given subsurface volume, there is presumed to be a background or ambient stress state, often expressed as a "far field" stress value, for every point within a volume. In many cases for the purposes of modeling and analysis, it is appropriate to assume that the background stress state is homogeneous within a given volume of interest.

Figure 2A:
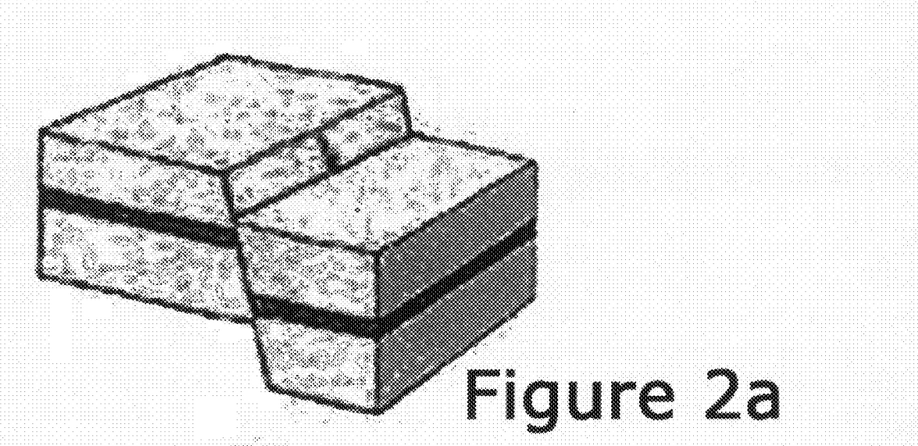
FIGS. 2a through 2c are perspective depictions of various types of faults that may be present in subsurface regions.
Figure 2B:
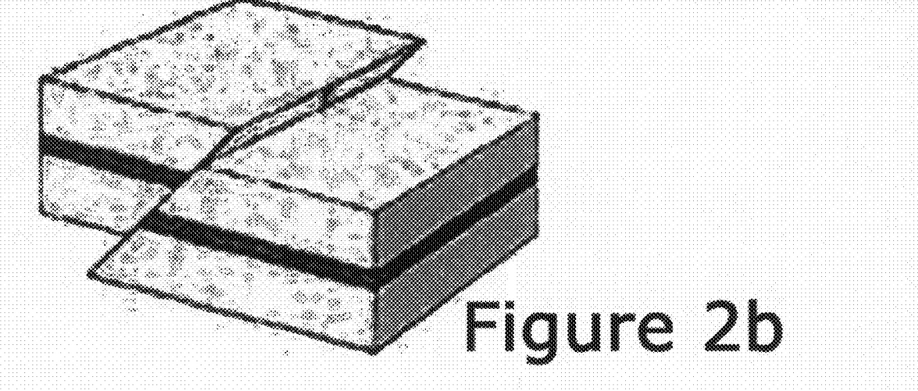
Figure 2C:
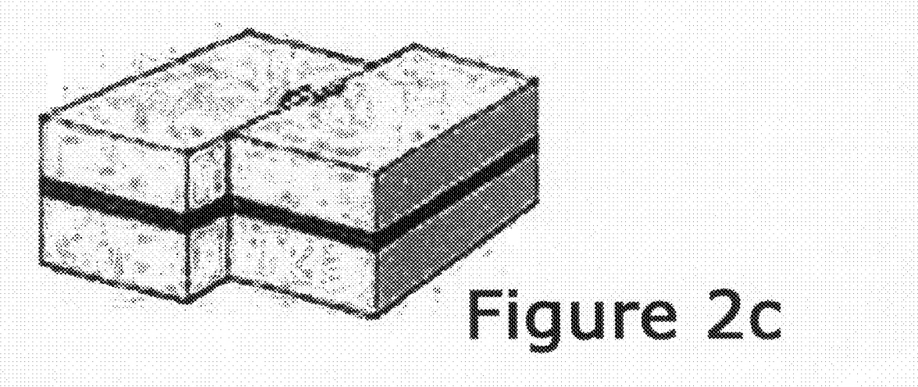

Those of ordinary skill will further appreciate that if a fault is present within a volume, the stress field proximate to the fault plane, i.e., the local stress state, will vary from the far field stress state. FIGS. 2a, 2b, and 2c illustrate different types of faults, including a normal fault (FIG. 2a), a "thrust" fault (FIG. 2b), and a "strike slip" fault (FIG. 2c). A common feature of each of these is that the fault can be generally characterized in terms of a fault plane, i.e., the planar interface between two opposing subsurface regions. Should there be any relative movement between the regions defining the fault, there may be a change in the background stress state for the volume as a whole.

Referring again to FIG. 1, in a hypothetical ideal drilling operation, the borehole 22 will have a substantially uniform and substantially circular cross section throughout its length. In practice, however, those of ordinary skill will appreciate that during the drilling process, the rotating drill string may cause mechanical damage to the borehole at various depths rendering the borehole noncircular In addition, a phenomenon known as "breakout" can occur. Breakouts are essentially stress-induced failure of the borehole wall, and are generally considered to be undesirable, as they can lead to irregularities in the rotation of the drill string, possibly leading to excessive vibration and wear on the drillstring components. The characteristics of breakouts may be impacted by a variety of factors, including the composition of the material the drillstring penetrates, the stress state of the region surrounding the drill string, and other factors. These and other features and characteristics of breakouts are described in Zorbak, et al., "Well Bore Breakouts and in situ Stress," *J. Geophys. Res.*, 90, 5523-5530, 1985 ("Zorback"), and in Bell et al., "The Use of Borehole Breakouts in the Study of Crustal Stress," in *Hydraulic Fracturing Stress Measurements*, Zoback et al, eds., pp. 201-209, National Academy Press, Washington, D.C., 1983 ("Bell"). Zorback and Bell are each incorporated herein by reference in their respective entireties.

The presence of faults in a region of interest is also of interest to a drilling operator. Faults can promote various undesirable conditions, including, for example, fluid loss or fluid eruption, reservoir compartmentalization, and so on. Faults also can present a hazard to the drilling operator, since a fault can result in the reduction or loss of drilling mud circulation, borehole collapse, or undesirable and unplanned borehole trajectory offsets.

As noted above, various techniques and tools are available for detecting and characterizing faults that are penetrated during a drilling operation, and the effects of these known faults can be accounted for during the drilling process. However, faults nearby the borehole region but not necessarily penetrated directly by the borehole can also have similar undesirable effects on a drilling operation and on reservoir characteristics and productivity. Recognition of this has led to the development of the aforementioned remote sensing tools and technologies, which, as previously noted, have enjoyed only limited success in accurately detecting and characterizing fault conditions remote from the actual borehole.

The present invention is based in part upon the recognition that active and recently active faults will produce a secondary or localized perturbation in the stress state. This localized perturbation will be superimposed upon the far-field stress state of the region. Such superimposed stress fields can adversely impact the drilling operation. For instance, a localized stress field can promote drilling-induced or stress-induced wellbore breakouts.

In accordance with one aspect of the invention, analysis of breakouts that are observed in the drilling operation can assist in the detection of faults in the vicinity of the borehole but not necessarily penetrated by the borehole. Breakout characteristics of interest include not only their location (depth), but also the orientation of the breakouts. Even a diminishing in the development of breakouts can provide information used by the present invention in the detection and characterization of nearby faults.

Figure 3A:
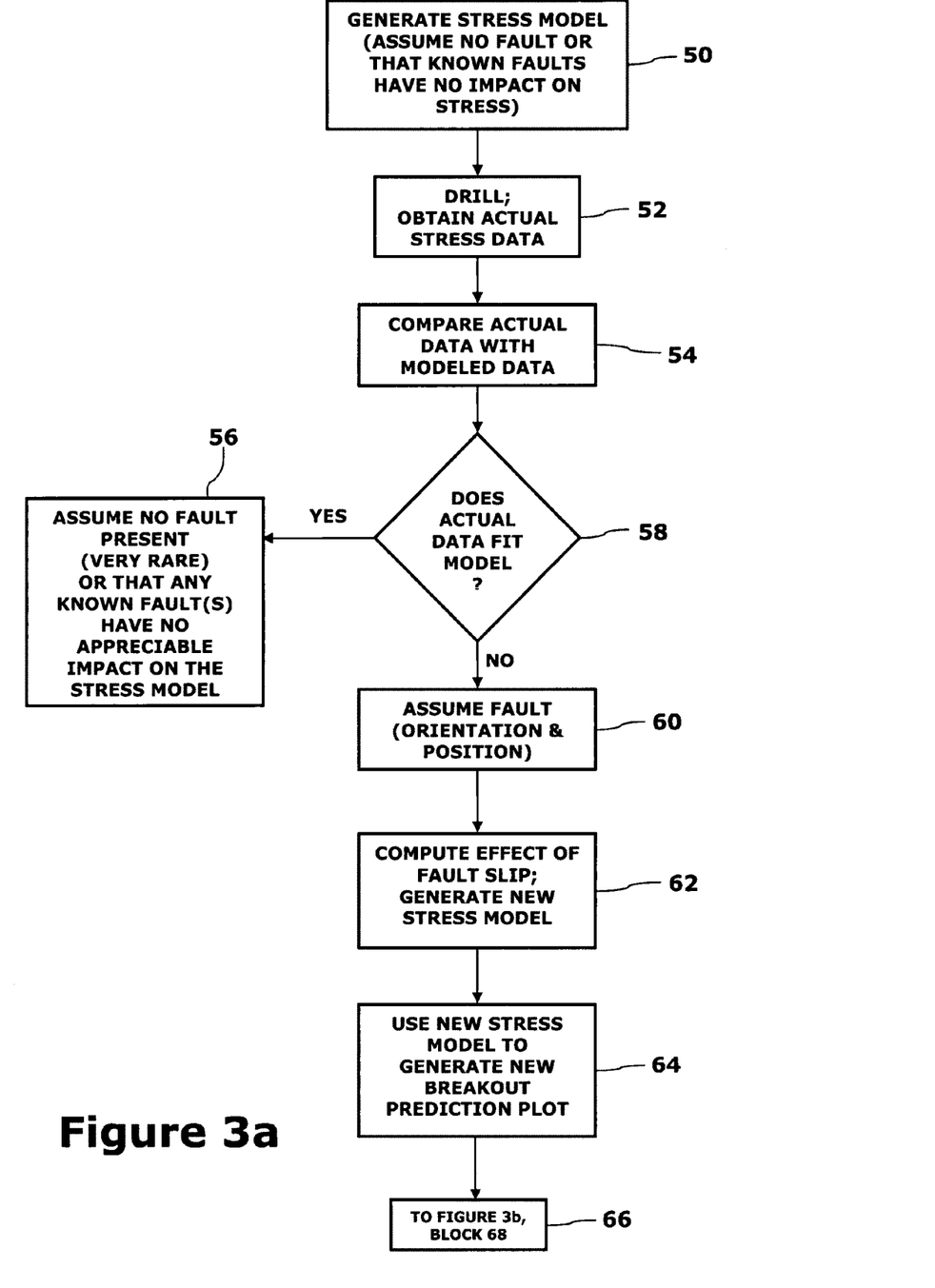
FIGS. 3a and 3b collectively comprise a flowchart depicting a process for remote characterization of faults in accordance with one embodiment of the invention.
Figure 3B:
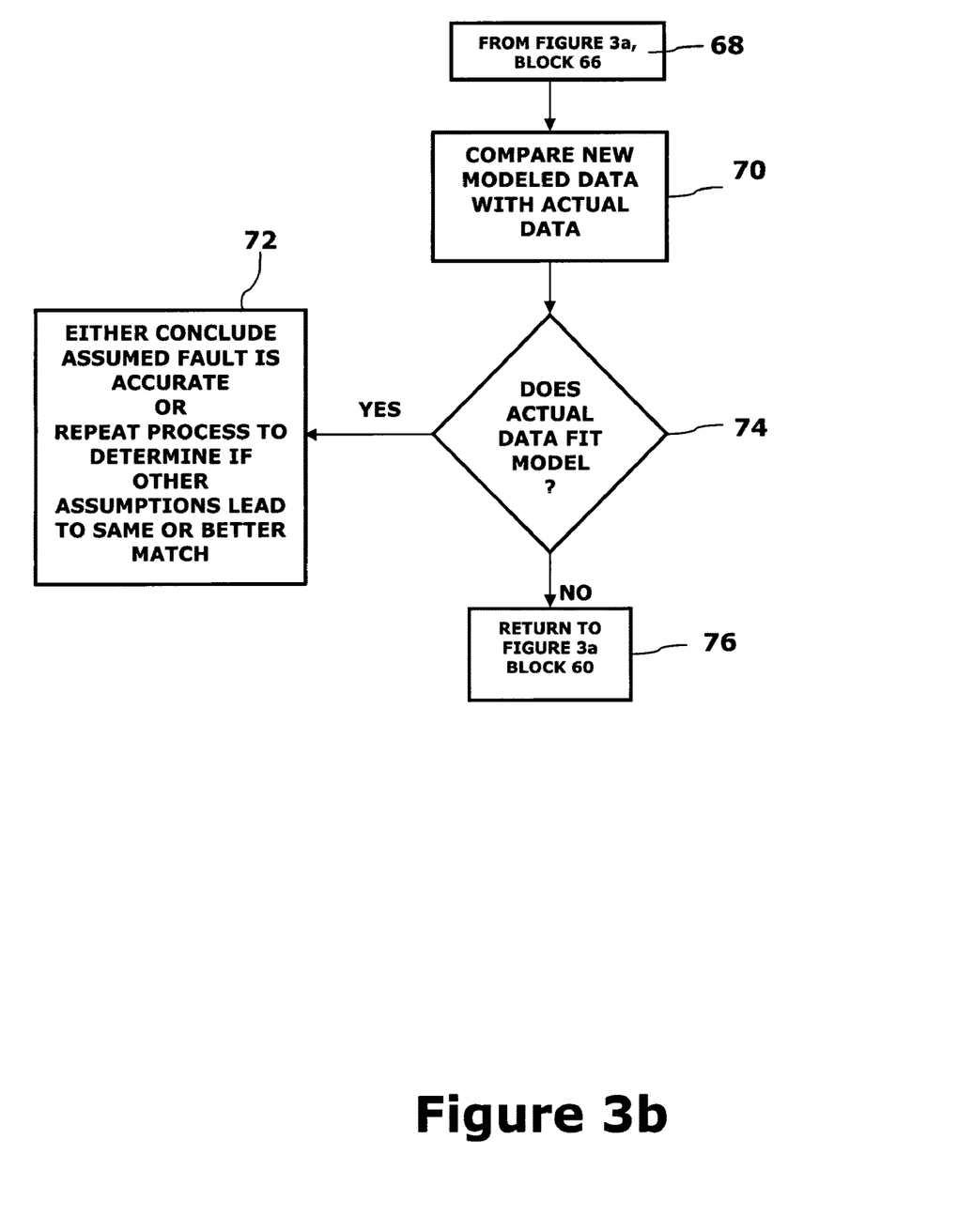

FIGS. 3a and 3b together form a flow chart illustrating the steps taken in accordance with a presently preferred embodiment of the invention for the remote sensing and characterization of faults.

Beginning with FIG. 3a, a process in accordance with one embodiment of the invention begins with the generation of a mathematical stress model for a region of interest, as represented by block 50. For the purposes of this description, reference will be made to the particular volume 20 shown in FIG. 1. Generating a mathematical stress model is a common process performed often and using various techniques by those of ordinary skill in the art. In the presently preferred embodiment, the stress model subdivides the volume 20 into a plurality of individual three-dimensional points (with a resolution of a specified number of points (voxels) per a specified volume (e.g., x number of points in each of the x- y- and z-dimensions), and includes, at a minimum, a stress value for each point within the volume. This voxel-based process is commonly practiced and familiar to those of ordinary skill in the art. Those of ordinary skill will appreciate, however, that mathematical stress models need not be voxel-based, may be expressed other terms.

Regarding the computer hardware for practicing the invention disclosed herein, those of ordinary skill will almost universally have at their disposal appropriate computer systems, which may range from common "personal" computers to more powerful workstations and the like. The computer system will include one or more processors for performing the data processing and mathematical computations described herein, and will further include mass storage devices for storage of the data and for storing software implementing the invention, in accordance with conventional practices. Of course, the computer hardware will further include a graphical interface for presenting graphical representations of data to a user, as well as a user interface (e.g., a keyboard and a cursor control device such as a mouse) for enabling a user to specify and control various processes performed by the system.

It is believed that the selection of one particular computer system over another is not critical for the purposes of understanding and practicing the invention, and those of ordinary skill can select and program an appropriate computer system to perform the functions as described herein.

In accordance with one aspect of the invention, the initial stress model generated in block 50 is performed assuming either that no faults are present in volume 20, or that any known faults in the volume are not active and thus do not impact the stress model. The stress model is generated based in part upon data obtained during previous drilling operations in or near the region, any seismic exploration data that might be available for the region, and various tests and experiments that can be performed, such as leak-off tests and hydraulic fracturing experiments. The resultant model corresponds essentially to the background or far-field stress state for the volume 20.

The next step in the process according to the presently disclosed embodiment of the invention is to perform the drilling operation to form borehole 22 or a portion thereof. This is represented by block 52 in FIG. 3a.

Also, to assist in characterizing the properties of a reservoir (e.g., making predictions as to production, an important indicator of the overall value of the resource), block 52 further represents the step of obtaining actual stress data including breakout data within the borehole. This is typically done during or following the drilling operation using conventional and well-known tools and techniques. As would be apparent to those of ordinary skill in the art, failing to identify and locate faults in a volume is highly undesirable.

Next, it is necessary to compare the actual stress data with the data predicted by the model generated in block 50. This comparison is represented by block 54 in FIG. 3a. In particular, the step 54 of comparison comprises using said initial model to generate a plot representing predicted breakout characteristics along the borehole.

Figure 4A:
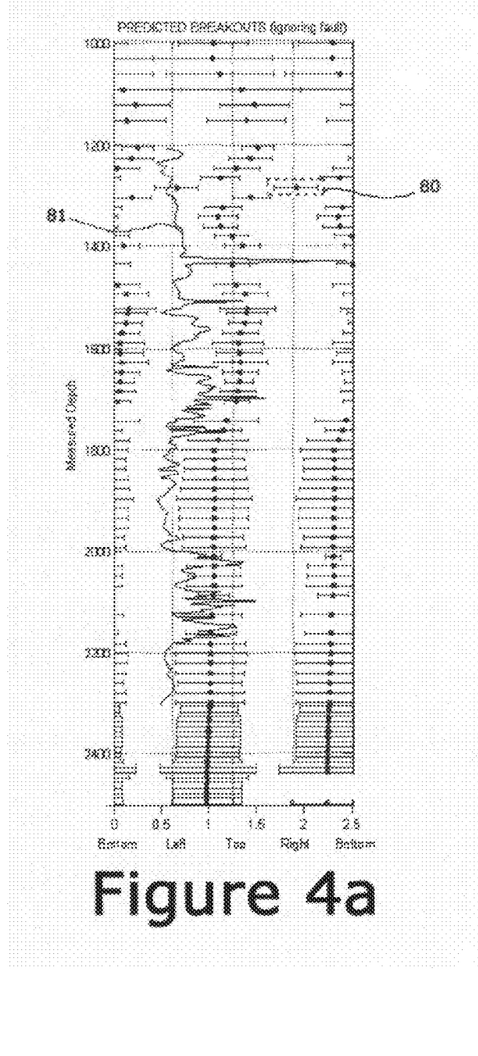
FIG. 4a is a graphical presentation of predictive breakout data for a segment of a borehole.

FIG. 4a is one way in which the data corresponding to the background stress state model generated at step 50 (FIG. 3a) can be presented to a user. (Those of ordinary skill will appreciate that there may be many other ways to graphically present the data/model; the approach exemplified by FIG. 4a is believed to be effective for the purposes of the present invention.) In particular, FIG. 4a shows a method by which predicted breakout characteristics derived from the initial stress model are shown. In FIG. 4a, the vertical axis of the plot represents measured depth along the borehole within volume 20, in this particular case, in a range between 1000 m and 2600 m. A number of "breakout symbols" such as the typical one shown within dashed line 80 appear in FIG. 4a. Each breakout symbol comprises a central "dot" with a line passing horizontally through and extending out the right and left hand sides of the dot some distance. Each breakout symbol conveys several pieces of information. First, the vertical position of each breakout symbol identifies the vertical depth to which the breakout symbol corresponds, as measured by the scale on the left-hand vertical axis (1000 m to 2600 m). The horizontal position of each central dot of each breakout symbol identifies the orientation of the breakout represented by the symbol, as registered against the bottom horizontal scale (north/east/south/west, or top, left, bottom, right, for example).

Furthermore, plot 81 in FIG. 4a shows the unconfined compressive strength of the material through which the borehole is passing, measured against the scale 0.0-2.5 shown at the bottom of FIG. 4a.

The horizontal line passing through each dot in each breakout symbol signifies the width of the breakout, as measured against the borehole circumference (e.g., bottom left, top, right bottom, as shown at the bottom of FIG. 4a. The vertical bars on each end of the horizontal line in a breakout symbol represents the depth of the breakout.

Of course, in FIG. 4a, the series of breakout symbols represents the predicted breakout characteristics (i.e., orientations, widths, and depths) based on the initial stress model, and thus based upon the assumption that no unknown faults are present in the volume 20, as previously discussed with reference to step 50 in FIG. 3a.

Returning now to FIG. 3a, once the borehole 22 has been drilled (step 52), the next step is to compare the predicted data from FIG. 4a to actual data measured during and/or after the drilling operation. This is represented by block 54 in FIG. 3a. To accomplish this comparison, it is useful to provide the plot such as shown in FIG. 4b, which shows actual measured values (orientation and depth) of breakout in wellbore 22 superimposed upon the predicted orientation and depth shown in FIG. 4a.

Figure 4B:
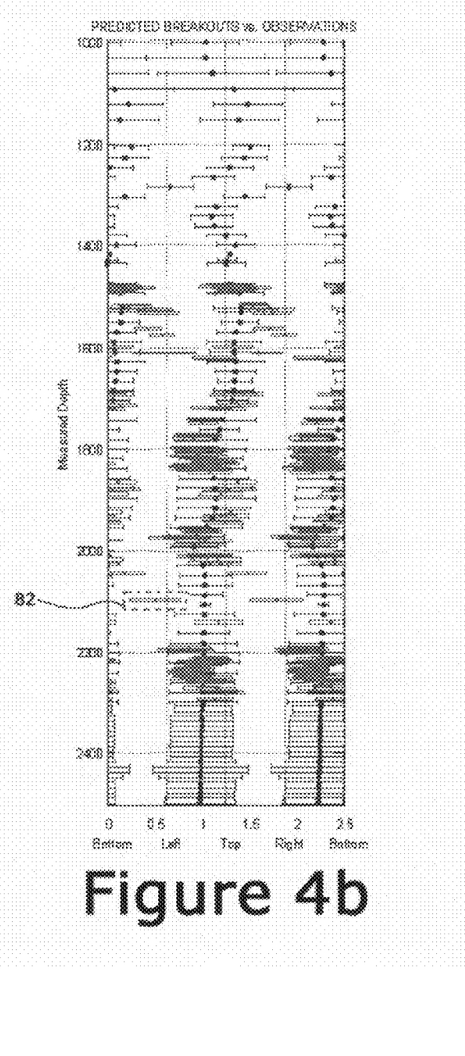
FIG. 4b is a graphical presentation of predictive breakout data for a segment of a borehole having a graphical representation of actual breakout data for the same segment superimposed thereon.

In FIG. 4b, like FIG. 4a, the breakout symbols reflect the predicted breakout based on the model generated in step 50 of FIG. 3a. In addition, a plurality of horizontal breakout bars, such as the exemplary one shown within dashed line 82 in FIG. 4b, are provided. Each breakout bar 82 represents actual measured breakout data from borehole 22 at each vertical depth for which a breakout bar is shown.

It will be immediately apparent to those of ordinary skill in the art having the benefit of the present disclosure that the extent to which the horizontal position and width of each breakout symbol 80 corresponds with the horizontal position and length of each breakout bar 82, this evidences the accuracy of the predictive data generated in step 50 and graphically represented in FIG. 4a with respect to the stress state within volume 20. That is, as a result of the manner in which the predictive data is displayed with the actual sensed data being superimposed thereon, a user is able to visually discern the degree to which the predictive data accurately models the actual stress state within volume 20.

In an alternative embodiment, the correspondence between the predictive data and the actual data can be assessed based upon more precise numerical comparison of the respective data sets. FIG. 4b shows however that the comparison can be accomplished with relative accuracy from mere visual observation of the respective breakout plots.

In very rare instances, it may be the case that the initial stress model, which assumes that no unknown faults exist within the volume 20, or that any known faults in volume 20 are inactive and thus have no effect upon the stress model, will prove to be accurate as reflected with excellent correlation between breakout symbols 80 and breakout bars 82 in a representation as shown in FIG. 4b. This rare occurrence is reflected by block 56 in FIG. 3a, which corresponds to an affirmative answer to the question posed in decision block 58 in FIG. 3a, namely, "Does the actual data fit the modeled data?"

More likely, the predictive data generated in step 50 will not correspond to any appreciable degree with the actual data obtained after drilling wellbore 22. In that case, and further in accordance with the presently disclosed embodiment of the invention, the process proceeds to step 60 in FIG. 3a, which calls for the user to assume that a fault does exist in the volume 20, and moreover that the fault has a particular orientation and position that is specified by the user as part of this step 60.

In the presently preferred embodiment of the invention the process of assuming the presence of a fault having a particular orientation and position is admittedly somewhat imprecise and is performed on a more or less ad hoc basis. It is believed however that those of ordinary skill in the art practicing the present invention can and will develop an intuitive sense of where a hypothetical fault lies based upon observation of the presentation in FIG. 4b of the predictive data and the sense data.

Further, it is contemplated that the step of defining a hypothetical fault within volume 20 can be systematized to some degree, for example, by specifying that a plurality of different hypothetical faults each having a predetermined relationship to the wellbore 22 will be experimentally examined as will be described herein in further detail.

With reference to FIG. 1, there is shown a fault plane 90 whose position and orientation is specified by the user as part of step 60 in FIG. 3a. Specification of the fault plane can be accomplished by defining a center point 92 in terms of its true vertical depth (TVD), an X coordinate and a Y coordinate, along with a fault width value and fault length value. The spatial orientation of the fault (i.e., the dip and strike of fault plane 90) must also be specified, as would be apparent to those of ordinary mathematical skill, to fully define the position and orientation of fault plane 90.

In accordance with a further aspect of the present invention, the next step 62 in the inventive process is to compute the effect of a fault slip, i.e., to compute the shear stress on fault plane 90. This step 62 involves estimating the amount of shear stress that must be added to the modeled system to bring the shear stress on fault 90 to any specified level, for example, zero. If zero is selected, this is the equivalent of assuming a displacement along the fault plane in a direction and for a distance sufficient to result in removal of all of the estimated shear stress on fault plane 90. It is believed that those of ordinary skill in the art having the benefit of this disclosure will be capable of performing this analytical computation without undue experimentation.

The result of step 62 is a stress model for volume 20 assuming that the fault has slipped enough to render the stress on fault plane 90 zero (or to the specified value). This new stress model is then used, as represented by block 64 in FIG. 3a, to generate a new breakout prediction plot, i.e., a plot similar to that of FIG. 4a, except that it is based on a the new stress model, which assumes the presence of hypothetical fault plane 90, rather than the initial stress model, which as discussed above assumes the presence of no faults in volume 20 or that any known faults in volume 20 are inactive.

As indicated in block 66 in FIG. 3a, the process continues as represented following block 68 in FIG. 3b. This next step, step 70, is to compare the new modeled data derived in step 62 and used to generate a new prediction plot in step 64, with the actual shear stress data obtained following drilling of borehole 22. Once again, this comparison is accomplished through generation of a plot like that shown in FIG. 4b, such that the extent of correspondence between the predictive data and the actual data can be visually observed.

This leads to decision block 74 in the inventive process, which calls for the user to make a determination whether the extent of correlation between the predictive data (which assumes the presence of fault plane 90) and the actual data constitutes a "match." If so, as represented by block 72, the user can either (i) conclude that the presumptive fault 90 is an accurate estimate of actual conditions within volume 20; or (ii) repeat the process, beginning at block 60 but assuming a different fault orientation and position to determine whether an even better correlation between predictive data and actual data can be achieved.

On the other hand, if there is plainly no sufficient correlation between predictive data and actual data, as represented by block 76, the inventive process likewise returns to step 60, at which time a different fault orientation and position is assumed and the fault slip stress model step 62, model generation step 64, and comparison step 70 are repeated.

The process as described above can be iteratively repeated for as many times as necessary or desired in a particular instance to achieve prediction of fault conditions within volume that is believed to be as accurate as is called for in a given case, as reflected by a correlation between predictive data and actual data observed in a comparison plot like that of FIG. 4b.

It has been experimentally established by the inventors that the process depicted in FIGS. 3a and 3b can in most cases be very effective in accurately predicting the presence of faults within volume 20, even when those faults are not actually penetrated by borehole 22.

Figure 5:
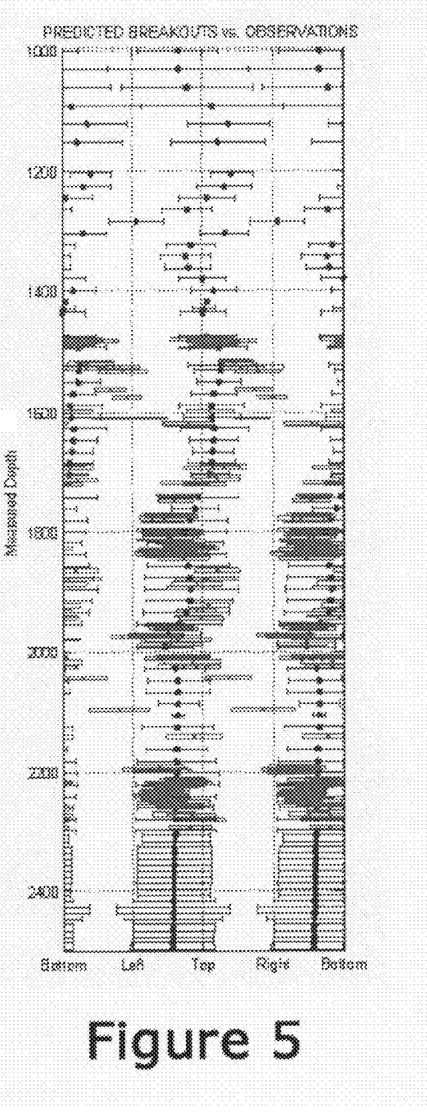
FIG. 5 is a graphical presentation of predictive and actual breakout data showing a high degree of correlation between the predictive and actual data.

FIG. 5 is an example of a comparison plot like that of FIG. 4b reflecting a good degree of correspondence between the predictive data (breakout symbols 80) and actual data (breakout bars 82).

Figure 6:
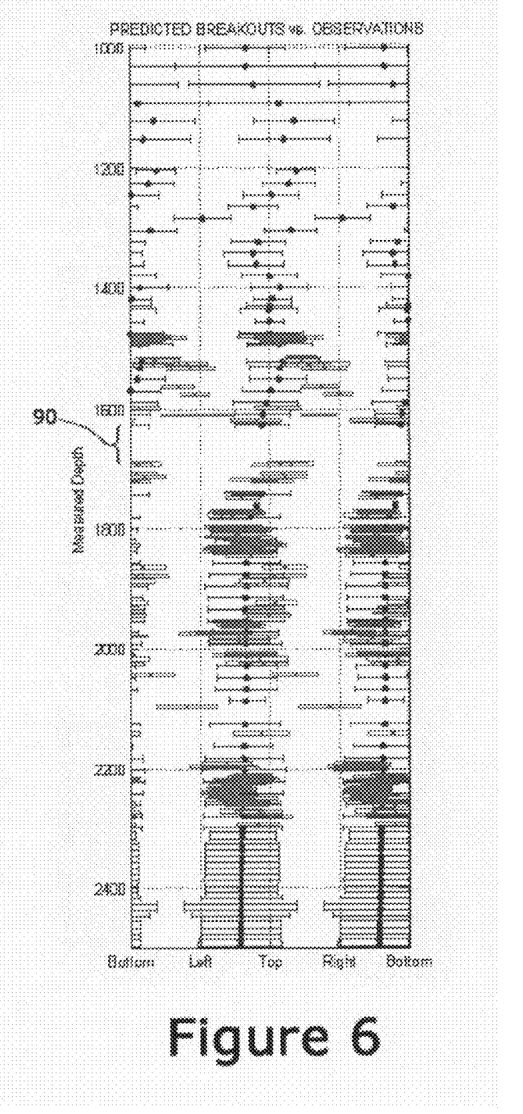
FIG. 6 is a graphical presentation of predictive and actual breakout data showing a segment where both the predictive and actual data indicate a segment having no borehole breakout.

In accordance with a further aspect of the invention, the diminished presence of breakout in a wellbore like wellbore 22 can be as informative as in cases where breakout is present. FIG. 6 shows an example of a comparison plot, wherein a particular TVD segment, identified generally with reference numeral 90, exhibits a lack of breakout, both in the actual data (breakout bars 82), as well as in the predictive data (breakout symbols 80).

From the foregoing detailed description, it should be apparent that a system and method for characterizing subterranean features in the vicinity of boreholes has been disclosed. Although a specific embodiment of the invention has been described herein, it is to be understood that this has been done solely for the purposes of illustrating various features and aspects of the invention, and is not intended to be limiting with respect to the scope of the invention, as defined in the claims. It is contemplated and to be understood that various substitutions, alterations, and/or modifications, including such implementation variants and options as may have been specifically noted or suggested herein, may be made to the disclosed embodiment of the invention without departing from the spirit or scope of the invention.

What is claimed is:

1. A method of characterizing faults in the vicinity of a borehole extending through a subterranean volume, comprising:
    (a) generating an initial mathematical stress model from which breakout conditions along a borehole trajectory within said volume can be predicted;
    (b) performing a drilling operation to form said borehole within said volume;
    (c) obtaining actual breakout data reflecting actual breakout conditions along said borehole;
    (d) comparing said actual breakout data with breakout data derived from said initial stress model to assess accuracy of said model;
    (e) revising said initial stress model based on an assumption of a fault plane existing within said volume; and
    (f) comparing said actual breakout data with breakout data derived from said revised stress model to assess accuracy of said revised model.

2. A method in accordance with claim 1, further comprising repeating steps (e) and (f) at least once.

3. A method in accordance with claim 1, wherein said step (e) of revising said stress model comprises:
    (e)(1) assuming existence of a fault plane having a specified position and orientation within said volume;
    (e)(2) computing shear stress at a plurality of points on said fault plane; and
    (e)(3) revising said stress model to reflect a condition in which shear stress on said fault plane is adjusted to a specified value.

4. A method in accordance with claim 3, wherein said step (e)(3) comprises assuming a displacement occurring on said plane in a direction and for a distance such that shear stress on said plane reaches said specified value.

5. A method in accordance with claim 4, wherein said specified value is zero.

6. A method in accordance with claim 1, wherein said step (a) of generating a stress model comprises mathematically generating a stress model assuming that either no active faults are present in said volume, or that any faults in said volume do not cause perturbations in the stress within the model.

7. A method in accordance with claim 1, wherein said assumed fault plane is not intersected by said borehole.

8. A data storage device readable by a computer tangibly embodying a program of instructions for causing said computer to perform the method of any of claim 1 through 7.

9. A computer- and software-based system for characterizing faults in the vicinity of a borehole extending through a subterranean volume, comprising:

at least one processor operating under control of software for generating a mathematical stress model for said volume such that breakout conditions along the length of said borehole may be predicted;

drilling and sensing systems for drilling said borehole and generating data reflecting actual sensed breakout conditions along said borehole;

a graphical interface for presenting a graphical representation of predicted breakout conditions derived from said model and for presenting a graphical representation of actual breakout conditions along said borehole, such that a user can assess the degree to which said predicted breakout conditions correlate to said actual breakout conditions;

a user interface for permitting a user to control said at least one processor to generate a revised stress model for said volume, such that said stress model may be iteratively revised to achieve a higher degree of correlation between breakout conditions predicted based on said model and actual breakout conditions.

* * * * *